US005524451A

United States Patent [19]
Tippmann

[11] Patent Number: 5,524,451
[45] Date of Patent: Jun. 11, 1996

[54] METHOD AND APPARATUS FOR FREEZING FOOD PRODUCTS

[75] Inventor: Robert Tippmann, 4195 Hejld Rd., NW., Palm Bay, Fla. 32907

[73] Assignee: Robert Tippmann, Palm Bay, Fla.

[21] Appl. No.: 489,824

[22] Filed: Jun. 13, 1995

Related U.S. Application Data

[63] Continuation of Ser. No. 229,234, Apr. 18, 1994, abandoned.

[51] Int. Cl.⁶ ..................................................... F25C 1/12
[52] U.S. Cl. .................................. 62/352; 62/356
[58] Field of Search ............................ 62/71, 352, 353, 62/356

[56] References Cited

U.S. PATENT DOCUMENTS

| | | | |
|---|---|---|---|
| 3,380,261 | 4/1968 | Hendrix et al. | 62/352 X |
| 3,418,823 | 12/1968 | Vivai | 62/353 X |
| 3,851,035 | 11/1974 | Kuhnlein | 62/71 X |
| 4,045,979 | 9/1977 | Mazzini | 62/352 |
| 4,199,956 | 4/1980 | Lunde | 62/352 X |
| 4,207,750 | 6/1980 | Simkens | 62/352 X |

*Primary Examiner*—William E. Tapolcai
*Attorney, Agent, or Firm*—Malin, Haley, DiMaggio & Crosby

[57] ABSTRACT

A new method and apparatus for freezing food products utilizing a conventional refrigeration cycle. Refrigerant is fed into an array of heat transfer tubes mounted for immersion in a container of perishable food product whereby heat is transferred from the food product to the refrigerant causing the food product to freeze within a predetermined radius of each heat transfer tube. Each heat transfer tube is comprised of an outer fluid conveying member and an inner fluid conveying member that is generally coaxial or concentric with the outer fluid conveying member. After the food product is frozen, the food product container is lowered, leaving the frozen food product suspended by the heat transfer tubes. A support is placed under the frozen product. The frozen product is removed from the apparatus by heating the tubes so as to thaw a quantity of frozen material in the immediate vicinity of the tubes, which causes the weight of the product to shift from the tubes to the support. The frozen product may thence be moved for storage, shipping, etc.

5 Claims, 5 Drawing Sheets

$P > \Sigma F$

METHOD AND APPARATUS FOR FREEZING FOOD PRODUCTS

This application is a continuation of application Ser. No. 08/229,234, filed Apr. 18, 1994, now abandoned.

BACKGROUND OF THE INVENTION

1. Field of the Invention

The present invention relates generally to an apparatus for freezing frozen food product, such as citrus juices, and more particularly relates to an apparatus having an array of refrigerated tubes mounted for immersion in a container of food product for freezing the food by introducing a chilling medium into the tubes.

2. Description of the Prior Art

A variety of freezing systems are disclosed in the background art for producing frozen blocks of ice or for limited use with specific foods. However, none address the problems considered by the present invention. For instance, Simpkins, in U.S. Pat. No. 4,207,750, discloses an apparatus for making ice blocks comprising a hollow body having downwardly projecting hollow block parts, a "paddlewheel," a water supply line including an actuating cock, and refrigerating fluid and heating fluid that are circulated separately through the body.

Another ice making machine is disclosed by Lunde, U.S. Pat. No. 4,199,956, wherein the apparatus includes agitator paddles and further includes an ice cube thickness sensor, a compact control module, feelers containing switch actuating magnets to activate cycles, and a freezing element about which the ice cubes form.

In U.S. Pat. No. 3,418,823 to Salimbeni Vivai, there is disclosed, in the background art, a plurality of elongated, refrigerated molds, dependent from the roof of a casing, having V-shaped passages which are interconnected by pipes for the flow of refrigerating fluid and having a separate passage for subsequently heating the refrigerated molds.

Additional ice-making machines are disclosed by Lowe, U.S. Pat. No. 3,146,610; Carpenter, U.S. Pat. No. 3,861,163; Wilbushewich, U.S. Pat. No. 3,274,794; Wilbushewich, U.S. Pat. No. 2,723,534; Wilbushewich, U.S. Pat. No. 2,594,529; and Brown, U.S. Pat. No. 5,076,069.

Wilbushewich, in U.S. Pat. No. 3,074,246, discloses a method and apparatus for cooling goods packed in containers, consisting of arranging the containers in closely spaced relationship to a cooling element, establishing thermal contact between the container and the element by means of a frozen liquid, cooling the element, and removing the container from the element.

Powers, U.S. Pat. No. 3,972,279, teaches a freezing, defrosting, and storage assembly for meat products, particularly turkeys, comprising a pallet having a plurality of vertically projecting tubes for piercing and freezing the meat products.

Goumy, U.S. Pat. No. 4,644,995, discloses a device for fabricating frozen molds or cores, comprising a fixed gassing box, a molding box, and a head for receiving and discharging gas.

The above-noted background art neither solves nor addresses the problems present in known freezing machines. The present invention solves these problems by providing an apparatus having an array of heat transfer tubes depending from a freezing and thawing media manifold that alternatingly pass chilling and heating media into the heat transfer tubes for freezing the food product about the tubes, and releasing the food product for remote storage or shipping.

SUMMARY OF THE INVENTION

There is disclosed herein a freezing apparatus comprising an array of heat transfer tubes mounted for immersion in a container of perishable food product, such as citrus juice, tomato juice, tomato paste, berries, cherries, peaches, a large variety of meat products, and many bulk vegetables. The array of heat transfer tubes is mounted to a frame assembly via a manifold arrangement. The manifold arrangement is adapted to selectively and alternatively supply interiors of the tubes with a chilling medium and a heating media to freeze the food and easily remove the frozen food product from the tubes, respectively. The manifold and array of heat transfer tubes depends from the top of a frame assembly, and a food product container associated with the frame is raised into a position where the heat transfer tubes are immersed the food product. The heat transfer tubes are then filled with the chilling medium, causing the food product to freeze within a predetermined radius of each heat transfer tube. After the food product is frozen, the food product container is lowered, leaving the frozen food product adhered in position about the heat transfer tubes. The food product along the walls and floor of the food product container are preferably left unfrozen so that the container may be easily removed from the frozen block of food product. The amount of food product frozen is controlled by the relative size of the heat transfer tubes compared to the container, temperature levels, the amount of time which the food product is exposed to the chilling, and/or the chilling medium employed. Thereafter, a heating media is introduced into the heat transfer tubes, which drives out the chilling medium and heats the tubes so that the frozen food product in immediate contact with the heat transfer tubes is thawed. When the frozen food product in the vicinity of the tubes thaws, the frozen block is released from the tubes, allowing gravity to act on the block so that it falls away from the tubes onto a receiving platform, whereupon the frozen food product may be placed into storage, shipped, etc. The receiving platform may comprise an automatic conveying system or a fixed platform, such as a pallet mounted to a forklift.

Each heat transfer tube is comprised of an outer fluid conveying member and an inner fluid conveying member that is generally coaxial or concentric with the outer fluid conveying member. The outer and inner fluid conveying members comprise pipe, conduit, tubes, or the like that each have hollow interiors fluidly communicated with each other. The interior of the outer tube is fluidly communicated with a source of the heating media, such as a heated gas, liquid, or vapor. Meanwhile, the interior of the inner tube is fluidly communicated with a source of the chilling medium, which may be any of the commonly known refrigerants, such as ammonia, glycol, chilled brine or the like. Alternatively, for example, ammonia can be used in a remote indirect heat exchanger to chill glycol such that the glycol is used in the heat transfer tubes.

To initiate the freezing method of this invention, a supply of non-frozen food product is placed into a container. The container is raised up so as to surround the array of heat transfer tubes and immerse the tubes in the food product. During the freezing process, a refrigerant, chilled water, or the like, is pumped into the inner fluid conveying member until it drains into the interior of the outer fluid conveying member, so as to generally fill the interior of the outer fluid conveying member. After a predetermined time, the food product freezes. The container is lowered by any known means so that the frozen food product is suspended by the heat transfer tubes.

In order to dislodge the frozen food product from the heat transfer tubes. Apparatus for supporting and conveying the frozen food product is placed below the frozen food product, and a heating media is pumped into the interior of the outer food conveying member of each heat transfer tube, causing the chilling medium to be backflushed through the interior of each inner fluid conveying member. In this way, the exterior of the heat transfer tubes is heated, causing a portion of the frozen food product in the vicinity of each heat transfer tube, via indirect heat exchange, to thaw. When that happens, the frozen food product drops onto the conveyance apparatus, whereupon it can be moved to storage, shipped, etc.

If desired, water or another substance may be applied to the heat transfer tubes and frozen thereon prior to immersion of the heat transfer tubes into the non-frozen food product so that, upon heating of the heat transfer tubes to remove the frozen food product therefrom, none of the frozen food product is allowed to thaw.

In accordance with these and other objects which will become apparent hereinafter, the instant invention will now be described with particular reference to the accompanying drawings.

DESCRIPTION OF THE PREFERRED EMBODIMENTS

Figure 1:
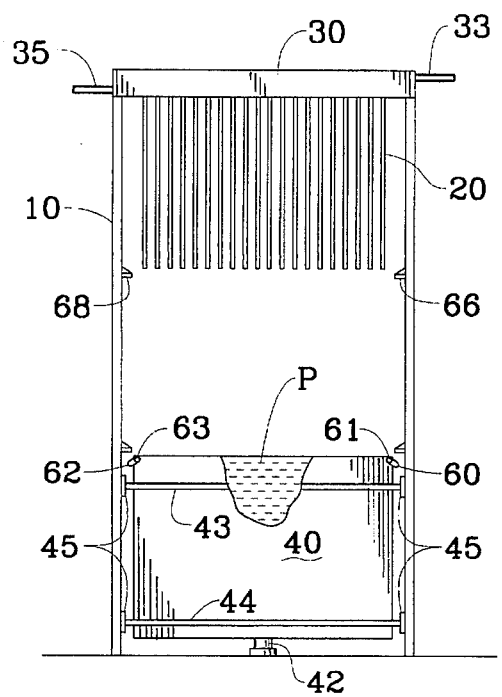
FIG. 1 is a front elevational view of the invention, showing the food product container, partially cut away, revealing the non-frozen food product inside.
Figure 2:
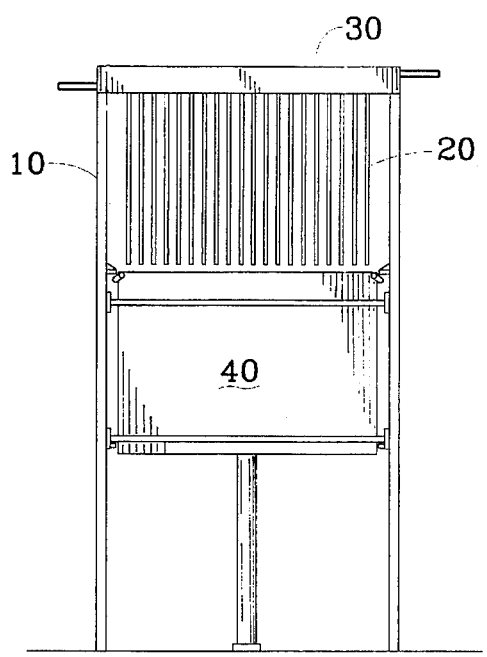
FIGS. 2–7 are front elevational views of the apparatus of the instant invention, depicting the various stages of the freezing process disclosed herein.
Figure 3:
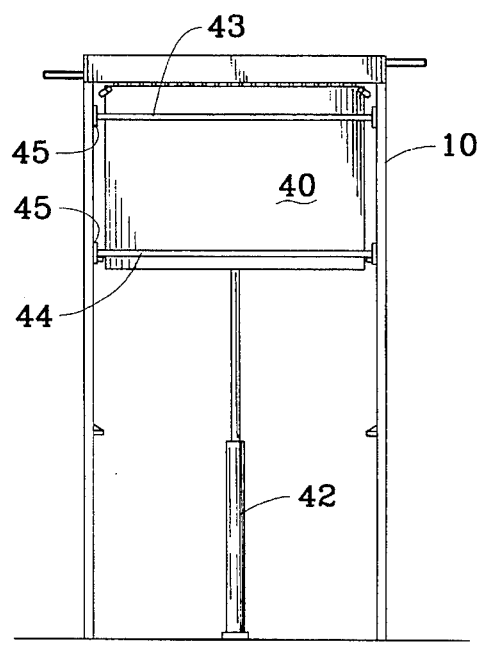
Figure 4:
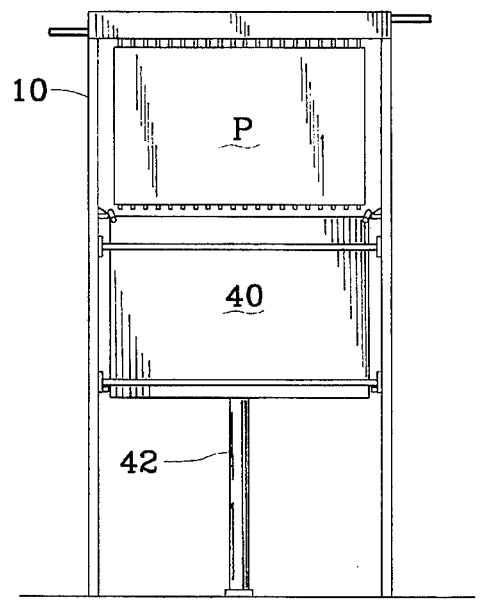
Figure 5:
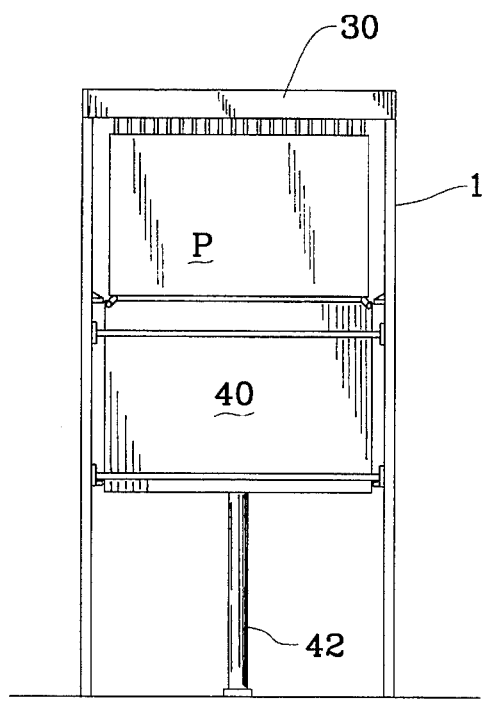
Figure 6:
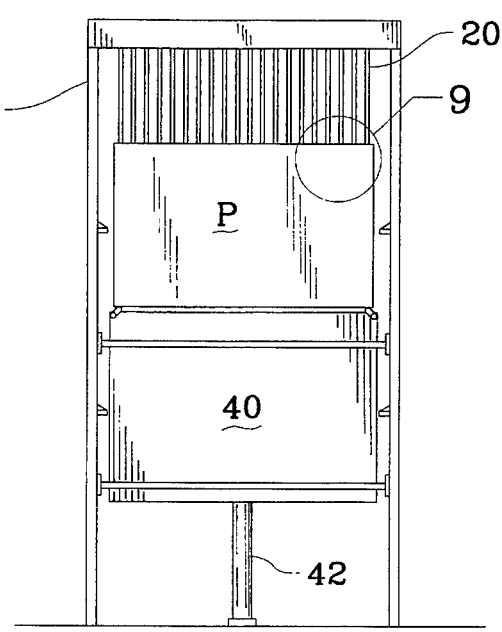
Figure 7:
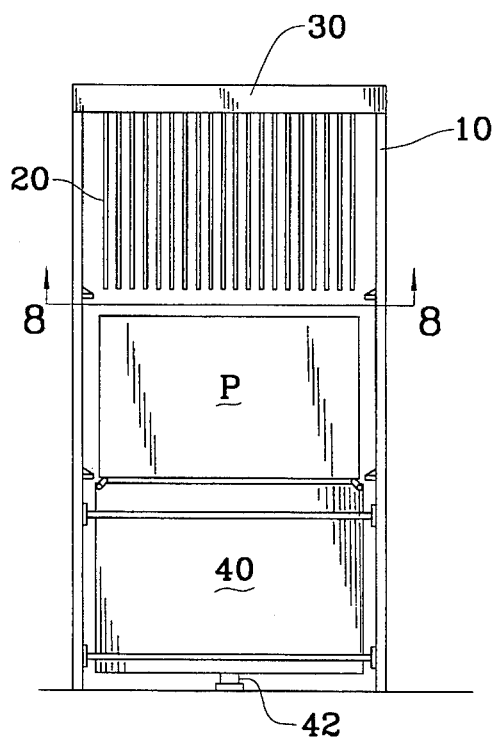
Figure 12:
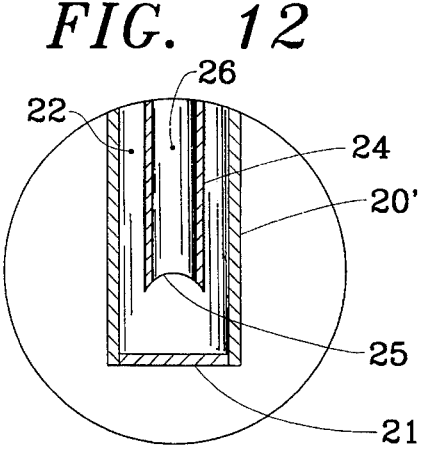
FIG. 12 is an enlarged view of the area of detail shown in FIG. 10.
Figure 8:
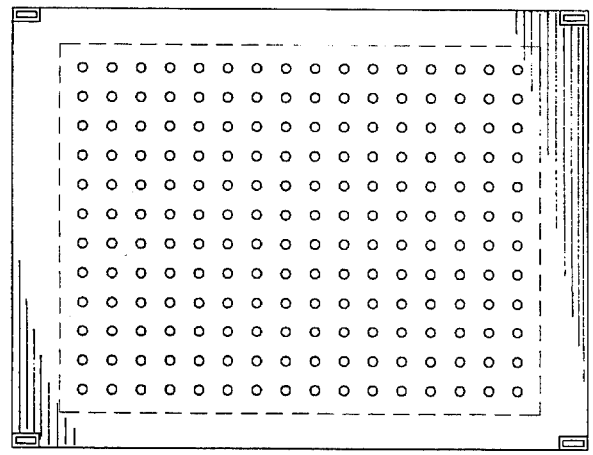
FIG. 8 is a bottom plan view of the freezing apparatus of the instant invention, taken along lines 8—8 of FIG. 7.
Figure 9:
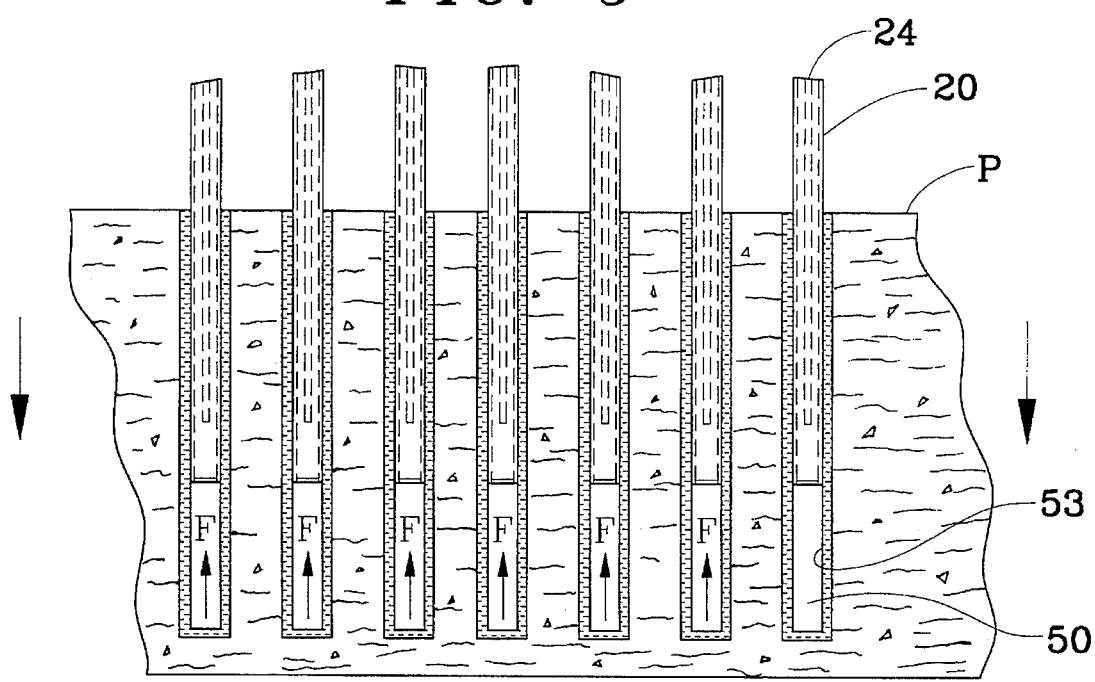
FIG. 9 is an enlarged view of the area of detail shown in FIG. 6, wherein the heat transfer tubes are partially removed from the voids created in the frozen food block.
Figure 13:
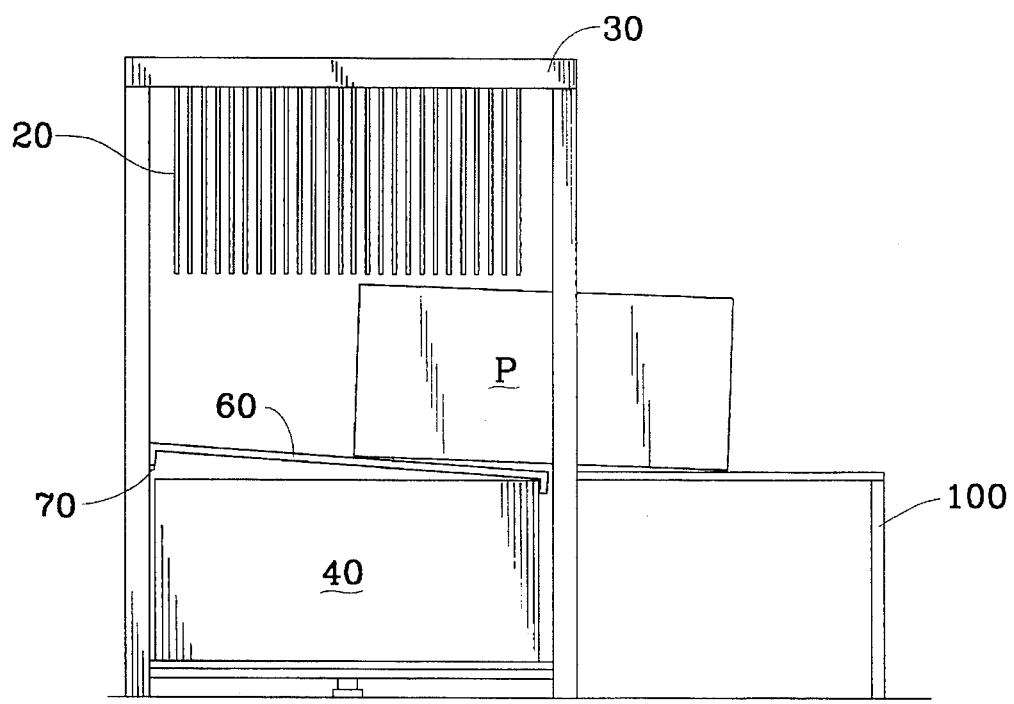
FIG. 13 is a front elevational view of the apparatus of the instant invention, depicting another stage of the freezing process disclosed herein.
Figure 10:
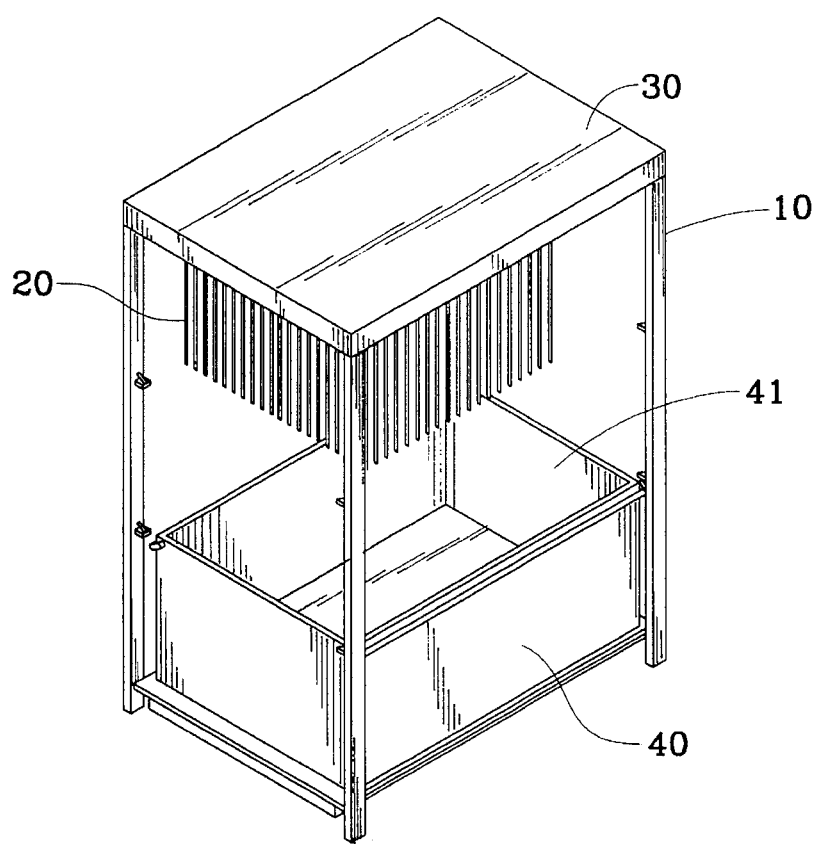
FIG. 10 is a top perspective view of the apparatus of the invention.

With reference to the drawings, FIGS. 1–14 depict an apparatus for freezing food products comprising a frame 10 to which is suspended an array of heat transfer tubes 20 mounted for submersion in a volume of food product P held in a food product container 40. The array of tubes is mounted to a manifold 30 having a lower compartment 32 and an upper compartment 36. The container 40 is raised and lowered vertically by a hydraulic cylinder, scissorjacks, a motor and pulley system, or the like.

Each heat transfer tube is comprised of an elongated, cylindrical, member having an inner tube fluidly communicated with an outer tube. However, it should be noted that the tubes may be other than cylindrical to meet the objects of the invention, so long as the hollow interiors of the inner and outer tubes are in fluid communication. The outer tube is connected to the lower compartment, and the inner tube extends through the lower compartment into the upper compartment. The inner tube provides an opening at its bottom for drainage and filling with chilling and heating media. During the freezing process, a refrigerant is pumped into the upper compartment and into the inner tube. The refrigerant drains through the opening at the bottom of the inner tube, filling each of the outer tubes. After the block is frozen, hot gas is pumped into the lower compartment to force the refrigerant to backflush through the inner tube, out the upper compartment, and through a refrigerant return line. As hot gas is pumped into the outer tubing, it transfers heat to the food product, causing it to melt sufficiently in the immediate vicinity of the heat transfer tubes, causing the frozen block to separate therefrom. Therefore, as a result of gravity, the block drops or slides from the refrigerated tubing under its own weight.

The food product P in container 40 is frozen radially outwardly from the tubes 20 as heat is transferred from the product to the tubes. However, the food product is preferably left unfrozen along the walls and floor of the container 40, so that a liquid buffer is maintained therebetween for the easy removal of the container from the frozen block of food product P. Several methods may be employed, individually or in combination, to control the amount of food substance which freezes. For instance, the length, width, and thickness of the tubes, the volume of chilling medium contained in the tubes, and the volume of refrigerant used. Consequently, the tubes are sized and the freezing process timed so that the outside and bottom of the food product P do not freeze. The outside and bottom sides of the food container may be monitored with a temperature probe to determine when the freezing process should be terminated and the container lowered from the block. Preferably, approximately two hundred to three hundred 5-foot heat transfer tubes may be employed with a container 40 having dimensions of 4 ft.×4 ft.×4 ft. As noted above, the outermost layer and bottom of the food product do not freeze, so that there is liquid remaining between the frozen block and the container floor. This liquid provides a buoyancy force that exerts an upward force to support the block. However, once the container is lowered away from the block, the force is transferred to the heat transfer tubes, which then support the block as a result of the adherence of the block to the tubes.

As the liquid food product is chilled, it freezes and adheres to the heat transfer tubes. Therefore, the heat transfer tubes 20 must be flushed with a heating medium to thaw the block P in the immediate vicinity of the tubes. This produces a liquid food product layer 53 between the tubes 20 and the voids 50 in the block created by the heat transfer tubes during the freezing process. Once the block loosens from the tubes so that the weight of the block, due to gravity, causes the block to slide downwardly on the tubes. However, as the block slides down from the tubes, a retarding suction force is created in the block openings 50. The suction force F is greatest just prior to the block clearing the tubes. Therefore, the weight of the frozen block P must be sufficient to overcome the maximum cumulative suction forces just prior to the tubes 20 separating from voids 50.

Figure 11:
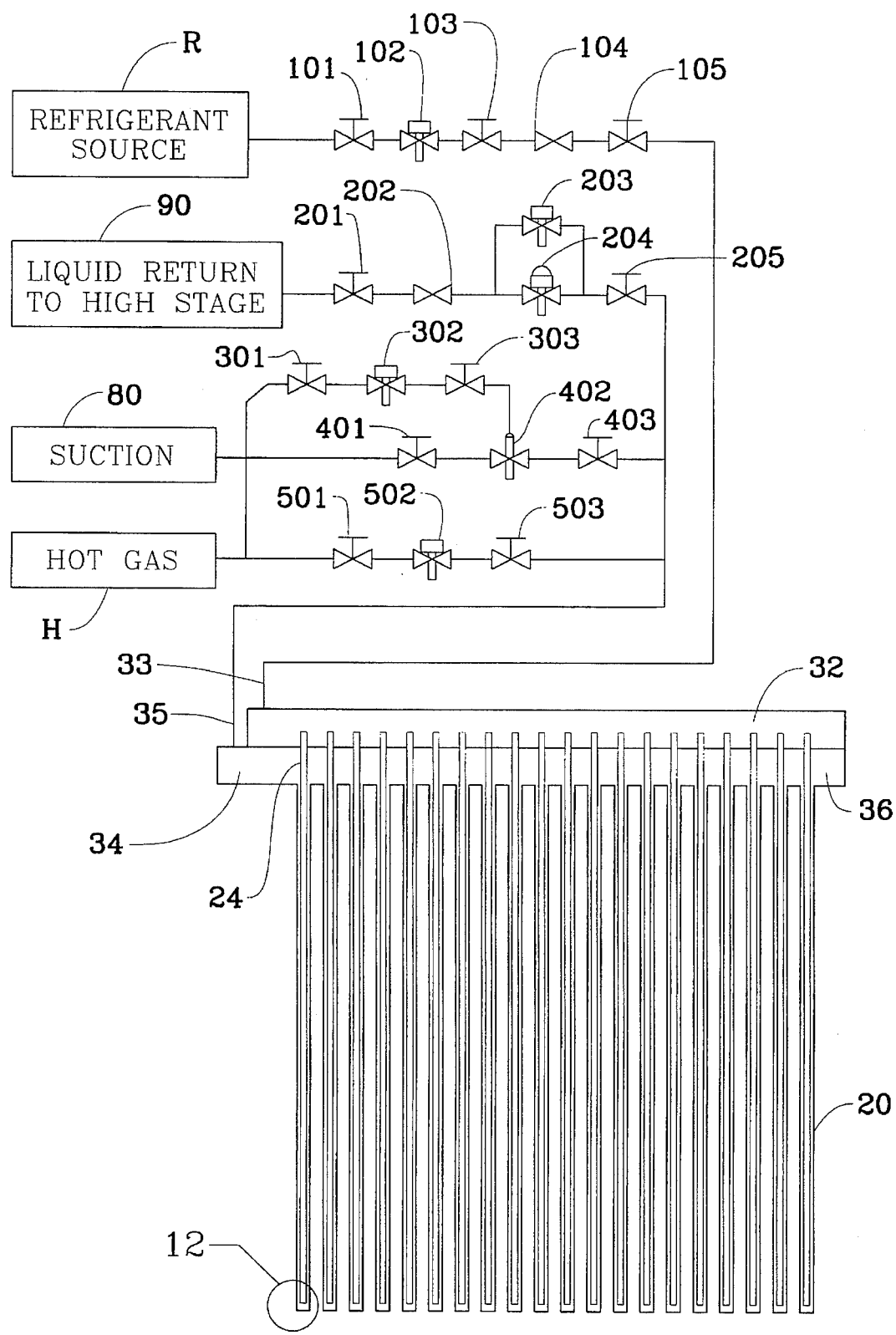
FIG. 11 is a schematic representation of the heating and chilling medium supply and return apparatus.

The manifold 30 is comprised generally of two independent compartments. The upper compartment 32, as best seen in FIG. 11, is fluidly communicated with the interiors 26 of inner tubes 24, and is also fluidly communicated with a refrigerant source R. The lower compartment 34 is fluidly communicated with the interiors 22 of outer tubes 20' and also with a source of heating medium H. Outer tubes 20' are closed at the bottom ends thereof by end walls 21. The lowermost ends of inner tubes 24 are open such that the interior 26 of each inner tube 24 is fluidly communicated with the interior 22 of each outer tube 20'. Also, it is preferred to radius the bottom opening 25 of each inner tube 24. The inner and outer tubes 24, 20', respectively, are, preferably, concentrically disposed with respect to one another. Accordingly, hot gas and refrigerant are alternately pumped into the lower compartment 34 and the upper compartment 32, respectively, as the system is cycled between freezing and heating. During the freezing process, a refrigerant is pumped into the upper compartment 32 and through the inner tube 24. The opening 25 at the bottom of the inner tube 24 allows the refrigerant to drain into the interior 22 of outer tube 20'. It has been determined that four times as much refrigerant liquid should be used for filling the heat transfer tubes as is actually required to freeze the food product P since the refrigerant liquid from refrigerant source R is eventually converted to a gas. Sending four times as much refrigerant liquid into the tubes for circulation is an industry standard, but may be varied as required. Saturated liquid is used at temperatures of approximately −40° F. for cooling the tubes. A suction pump 80 is operated at approximately 11 inches of vacuum to pull the refrigerant through the tubes 20 and the lower compartment 34. After the food product P has been frozen, a hot gas must be passed through the tubes 20' to loosen the frozen block away from the heat transfer tubes 20. This is accomplished by passing a hot gas at approximately 90° F., allowing for condensation, through the lower compartment 34 and into the outer tube 20', back up the inner tubes 24 and into the upper compartment 32. As the hot gas is pumped through the lower compartment and into the upper compartment, it is forced through the liquid return stage between 70 and 180 lbs. As best seen in FIG. 11, pressure through the liquid return stage is regulated by a pressure-regulation valve 204 and may be further effected by a bypass solenoid valve 203 to vary the diametric size of the tubes used. A check-valve 202 is also incorporated into the liquid return line to maintain flow in one direction.

The container 40 includes parallel bars 60, 62 on opposite sides thereof which are connected to the container by pivoting levers 61, 63. The levers 61, 63 are connected to the outside of the container 40 and, as the container is lifted up to and around the heat transfer tubes, the bars are caused to pivot to a position in which they project over the open top 41 of container 40. After the food product has been frozen, the container is lowered away from the tubes. As the elongated bars 60, 62 on the sides of the container 40 pass the lowest part of the heating tubes, tripping elements 66, 68 on each side of the frame 10 rotates the bars 60, 62 up and over the container top 41. This allows the rods to catch and support the frozen block P as it slides free from the rods while the container is being lowered into the lowest position of the frame, shown in FIG. 14.

In this lowest position, just prior to the container 40 reaching its lowest point of travel, one end of the bars 60, 62 are met by a stop 90, while the opposite ends of the bars 60, 62 are allowed to continue to move down with the container. This permits the bars to tilt so that once down travel has been completed by the container, the frozen block is automatically discharged by sliding from the bars 60, 62 onto a conveyor platform 100 for packaging or storage.

As best depicted by the piping diagram of FIG. 11, the refrigeration cycle can be described as follows: Liquid refrigerant from refrigerant source R is transported within refrigerant piping having a shut off valve 101, an electric stop valve 102, a restriction valve 103, check valve 104, and a normally open stop valve 105. Restriction valve 103 is present to control the refrigerant flow rate. When using an Ammonia refrigerant, a liquid refrigerant flow rate of approximately 1.6 pounds per minute per ton at a temperature of −45° F. and a pressure of 30 pounds per square inch is supplied to control valve 103. Control valve 103 regulates the refrigerant pressure such that the refrigerant on the leaving side of valve 103 is under a vacuum equivalent to 5 inches of mercury. The liquid refrigerant then enters upper liquid distributing chamber 32 flowing down the interior 26 of inner tube 24 into the interior 22 of outer tube 20. Heat transfer from the product through outer tube wall 20 to the enclosed refrigerant causes the product to freeze and the refrigerant to experience a phase change from liquid to vapor at a rate of approximately four tenths of a pound per minute per ton. Approximately 2.3 pounds per minute per ton of ammonia liquid travels up the interior 22 of outer tube 20', entering lower compartment 34 such that compartment 34 contains a mixture of Ammonia vapor and liquid at an approximate temperature of −45° F. and under a vacuum of approximately 11 inches of mercury. The liquid and vapor mixture then flows though properly sized refrigerant piping through stop valve 403, spring open gas close pilot operated valve 402, which is open during freezing but closed during defrost, and stop valve 403, to an accumulator where refrigerant vapor and liquid are separated with the liquid pumped back to valve 101 by passing through stop valve 205, pressure regulating valve 204, check valve 202 and stop valve 201. The separated vapor is then drawn from the accumulator, and compressed to a pressure such that the compressed vapor can be condensed back to liquid form by a conventional condensing means such as an evaporative condenser. This cycle is continues until the product is completely frozen into a monolithic block, and is controlled by a timing circuit.

To harvest the frozen product, a timer unit operates control valves in the following manner. First valve 102 is closed and valves 203, and 302 are opened resulting in the closure of valve 402 while valve 502 is opened. Thus hot gas, at a pressure between 120 and 185 psi is directed to valve 502. The gas flows through lower compartment 34 and into outside tubes 20 thus forcing any liquid refrigerant existing in the interior 22 of outside tubes 20 through inner tube opening 25, to upper compartment 32. The liquid and gas mixture is forced through piping 33 to valves 205, 203, 202, and 201, back to the refrigeration system via liquid return 90. This process continues for approximately 1 minute at the end of which time valve 203 is de-energized. The pressure on outer tubes 20 and chambers 32 and 34 continues to rise while pressure regulating valve 204 modulates to maintain the pressure in tubes 20 and 24 and chambers 32 and 34 at approximately 75 psi. At this pressure heat transfer from the refrigerant to the food product results in some refrigerant experiencing a phase change from vapor to liquid, and causing the food product in contact with outer tubes 20 to melt such that the monolithic block of food product releases from outer tubes 20. This cycle takes approximately 2 minutes. Once the block of food product has been removed, the container is again filled with product and the freezing cycle is repeated.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for freezing food product, comprising:

an array of downwardly depending heat transfer elements suspended for immersion in a food product to be frozen, said heat transfer elements each including an inner tube centrally disposed within an outer tube, the interiors of said inner tubes being in fluid communication with the interiors of corresponding said outer tubes, the interiors of said inner tubes each in fluid communication with a first refrigerant manifold, the interiors of said outer tubes each in fluid communication with a second refrigerant manifold;

said first and second refrigerant manifolds each in fluid communication with a refrigeration means for chilling and heating a heat transfer fluid;

a means for storing food product movable between a lowered position away from said heat transfer elements, and a raised position wherein said heat transfer elements are immersed in the food product;

means for pumping a chilling heat transfer fluid, from said refrigeration means, through said first manifold such that said chilling heat transfer fluid is generally uniformly distributed among the interiors of said heat transfer elements and flows through said inner and outer tubes respectively thereby freezing said food product within said container into a monolithic block;

means for controlling the duration of said flow of said heat transfer fluid such that said fluid flow is terminated after a predetermined duration of time;

means for retracting said means for storing food product to a lowered position after said chilling heat transfer fluid flow is terminated;

means for pumping a heating heat transfer fluid, from said refrigeration means, through said second manifold such that the heating fluid flows through said outer tubes and said inner tubes respectively thereby flushing any remaining chilling heat transfer fluid from the heat transfer element array while uniformly distributing the heating heat transfer fluid among said heat transfer elements thereby uniformly and simultaneously thawing a small portion of said frozen food product immediately surrounding each outer tube such that said frozen food product detaches from each of said heat transfer elements simultaneously.

2. An apparatus for freezing food product according to claim 1, wherein said chilling heat transfer fluid is either ammonia or a mixture of glycol and water.

3. An apparatus for freezing food product according to claim 1, wherein said heating heat transfer fluid is either ammonia or a mixture of glycol and water.

4. An apparatus for freezing food product according to claim 1, wherein said refrigeration means for chilling and heating a heat transfer fluid comprises said first and second manifolds each fluidly connected to a common refrigeration source.

5. An apparatus for freezing food product according to claim 1, wherein said refrigeration means for chilling and heating a heat transfer fluid comprises said first manifold fluidly connected to a first refrigeration source, and said second manifold fluidly connected to a second refrigeration source.

* * * * *